June 10, 1952     W. A. REASER ET AL     2,600,127
STRAIGHTEDGE GLASS PLATE BEVELING AND EDGING MACHINE
Filed April 13, 1949     12 Sheets-Sheet 1
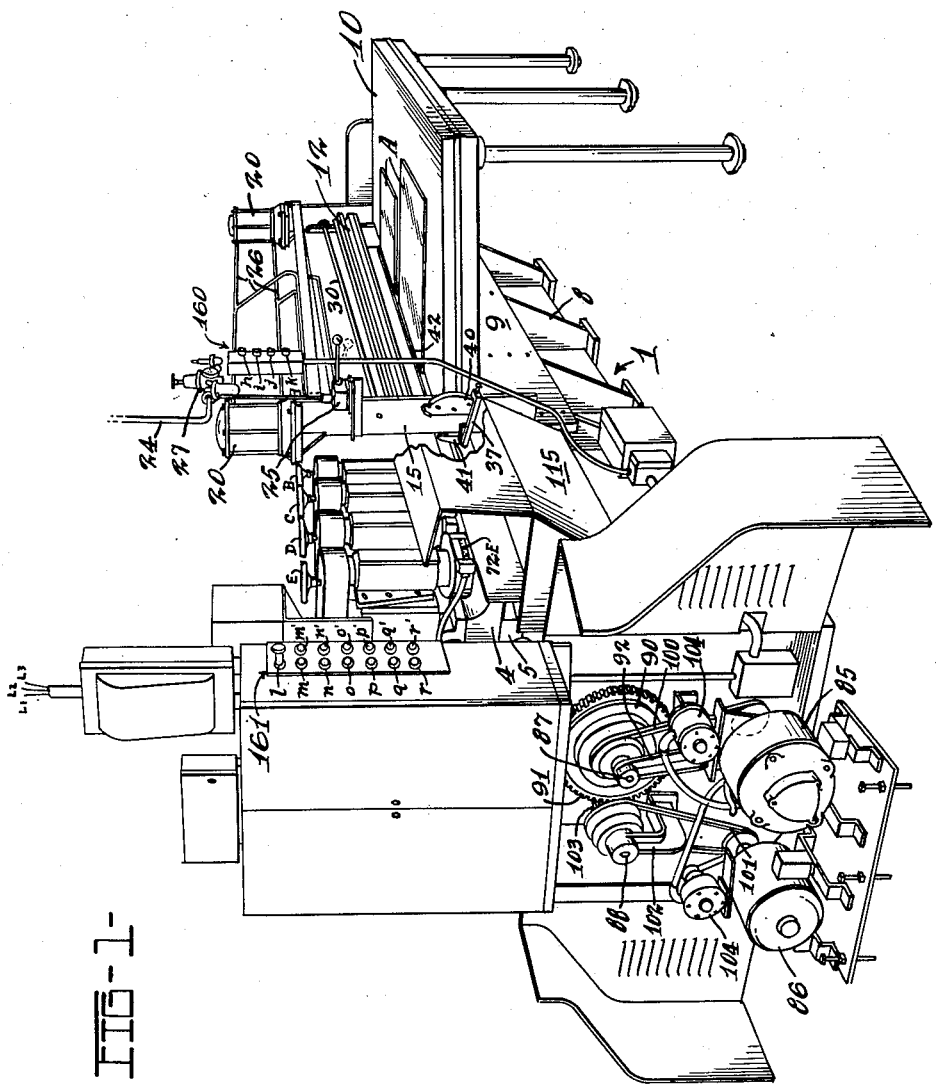
INVENTORS:
William A. Reaser,
Elmer A. Ziems,
John M. Christman.
BY Owen & Owen
ATTYS.

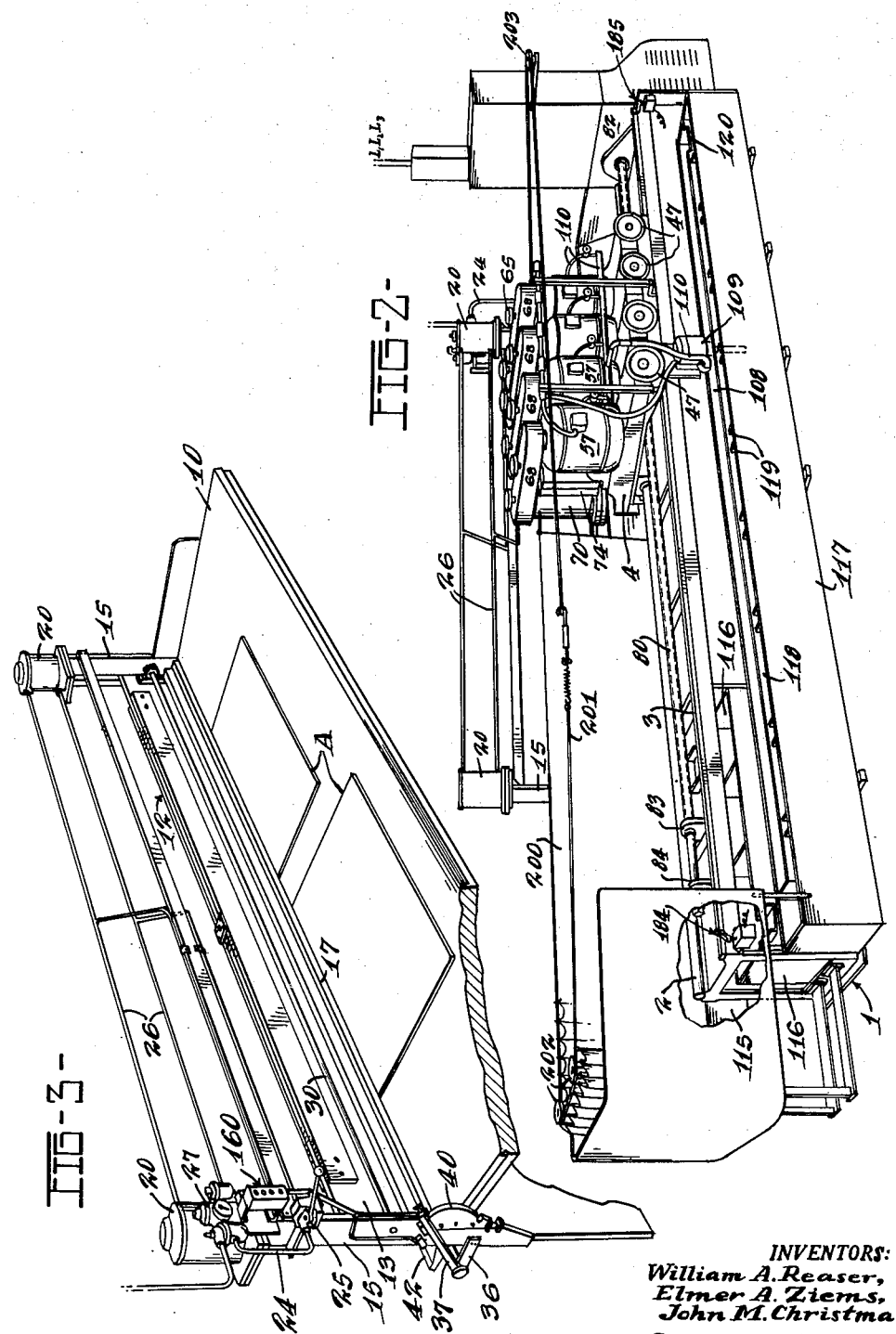

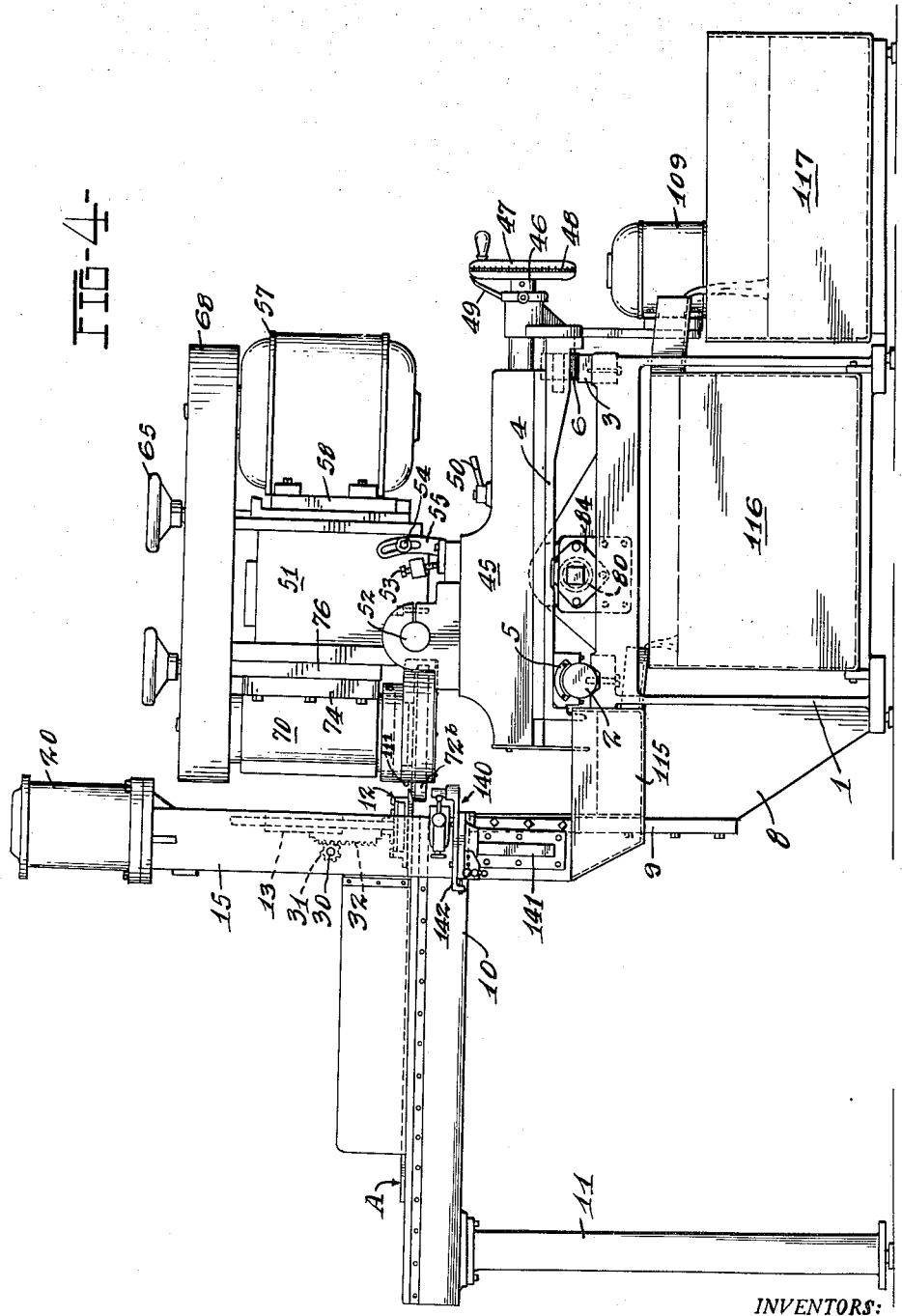

June 10, 1952   W. A. REASER ET AL   2,600,127
STRAIGHTEDGE GLASS PLATE BEVELING AND EDGING MACHINE
Filed April 13, 1949   12 Sheets-Sheet 4
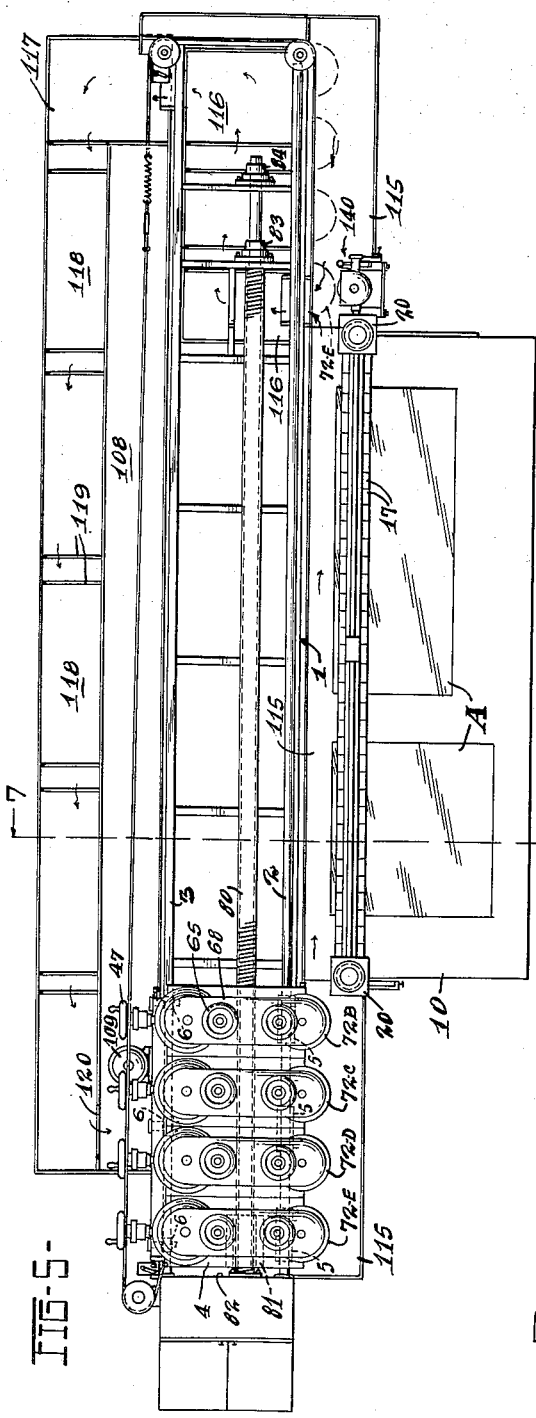
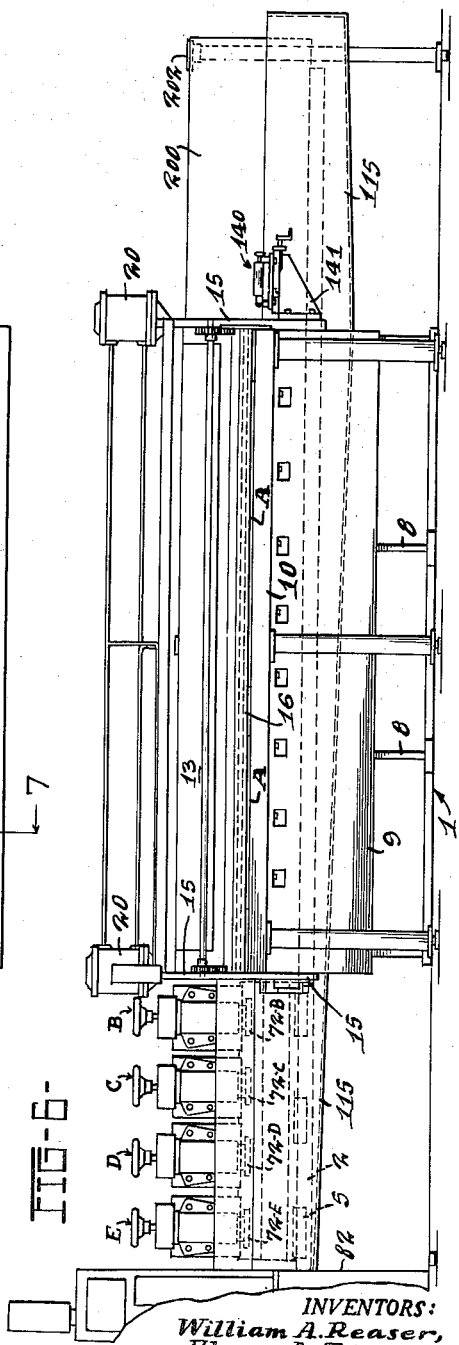
INVENTORS:
William A. Reaser,
Elmer A. Ziems,
John M. Christman
BY Owen & Owen
ATTYS.

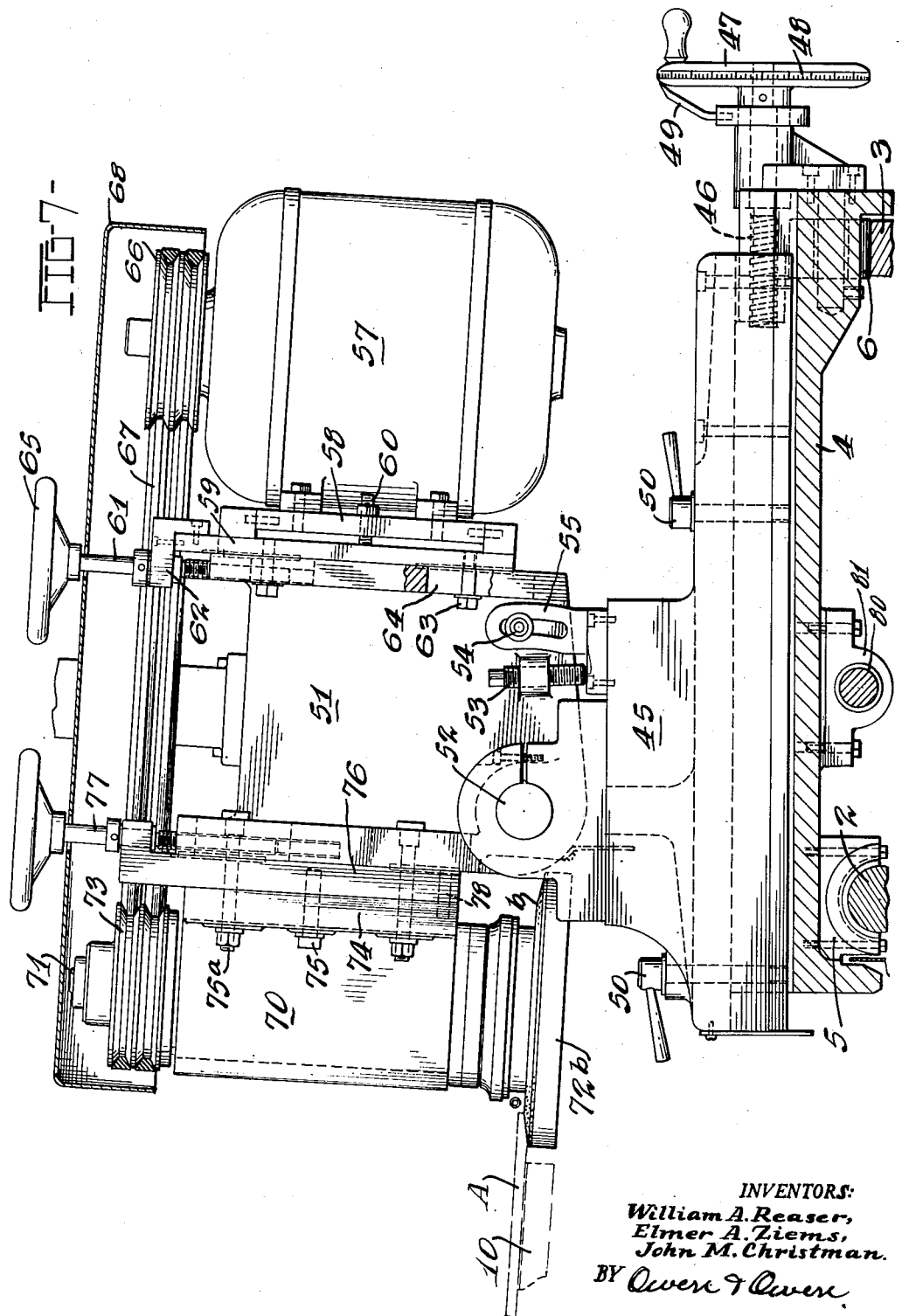

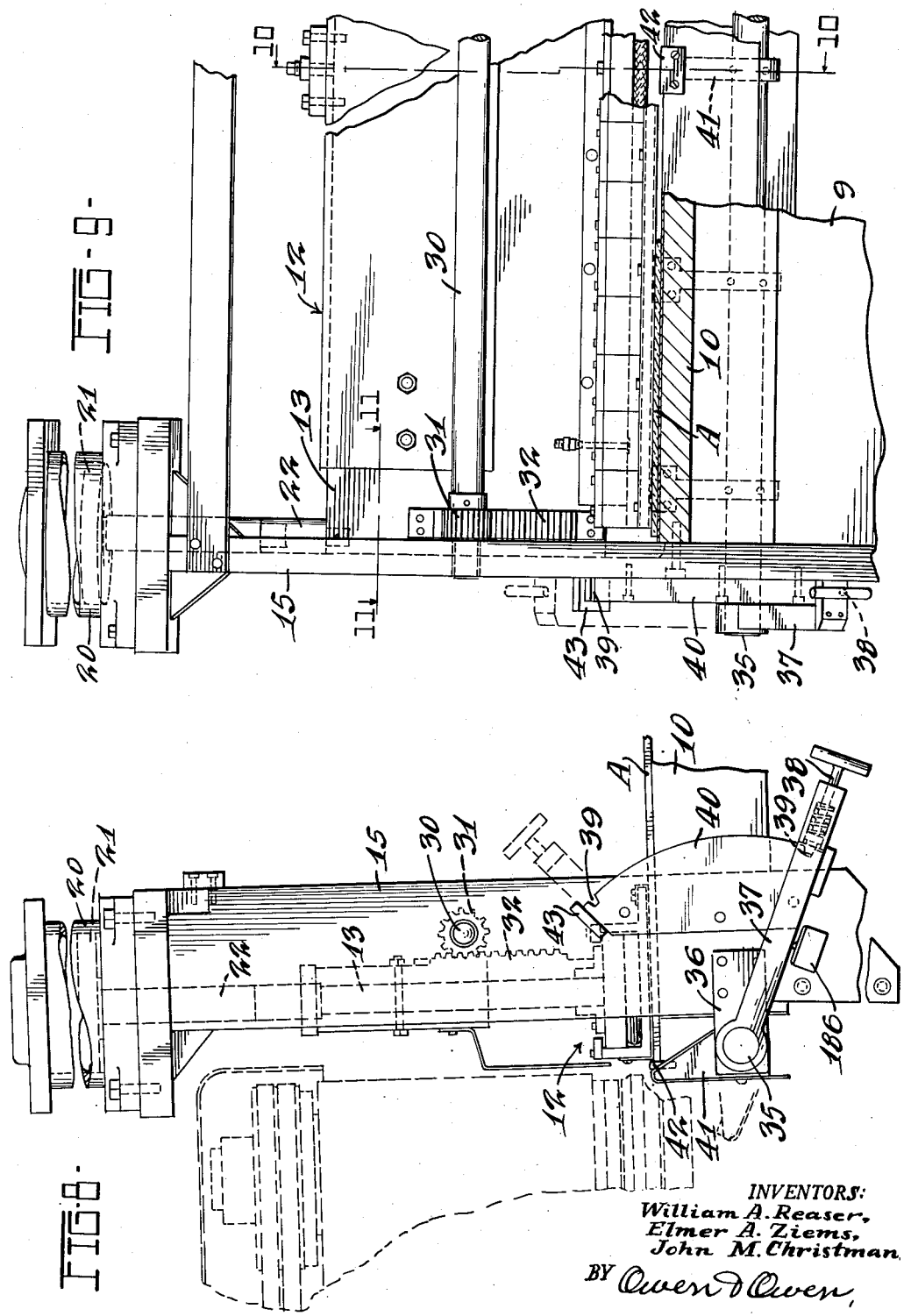

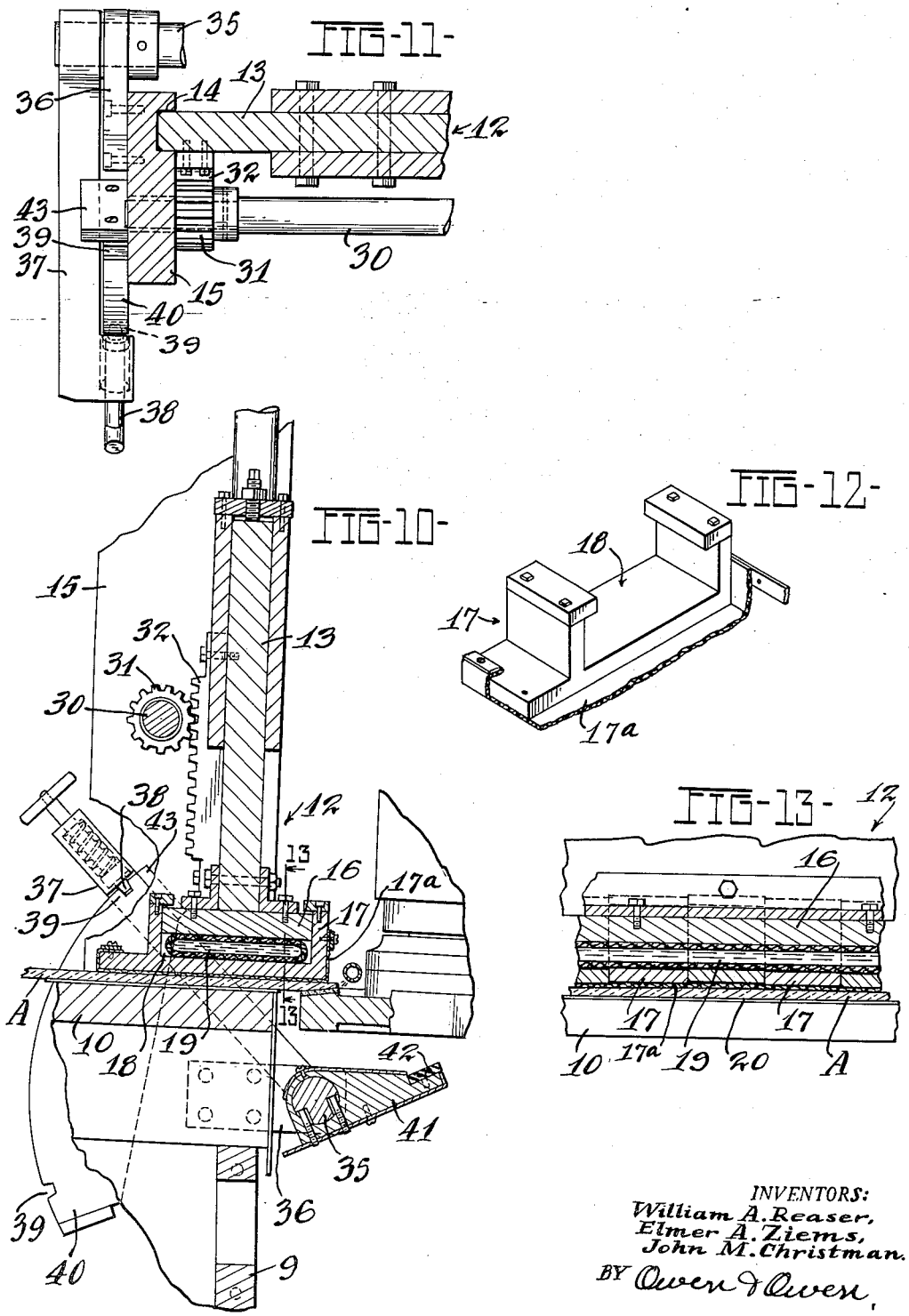

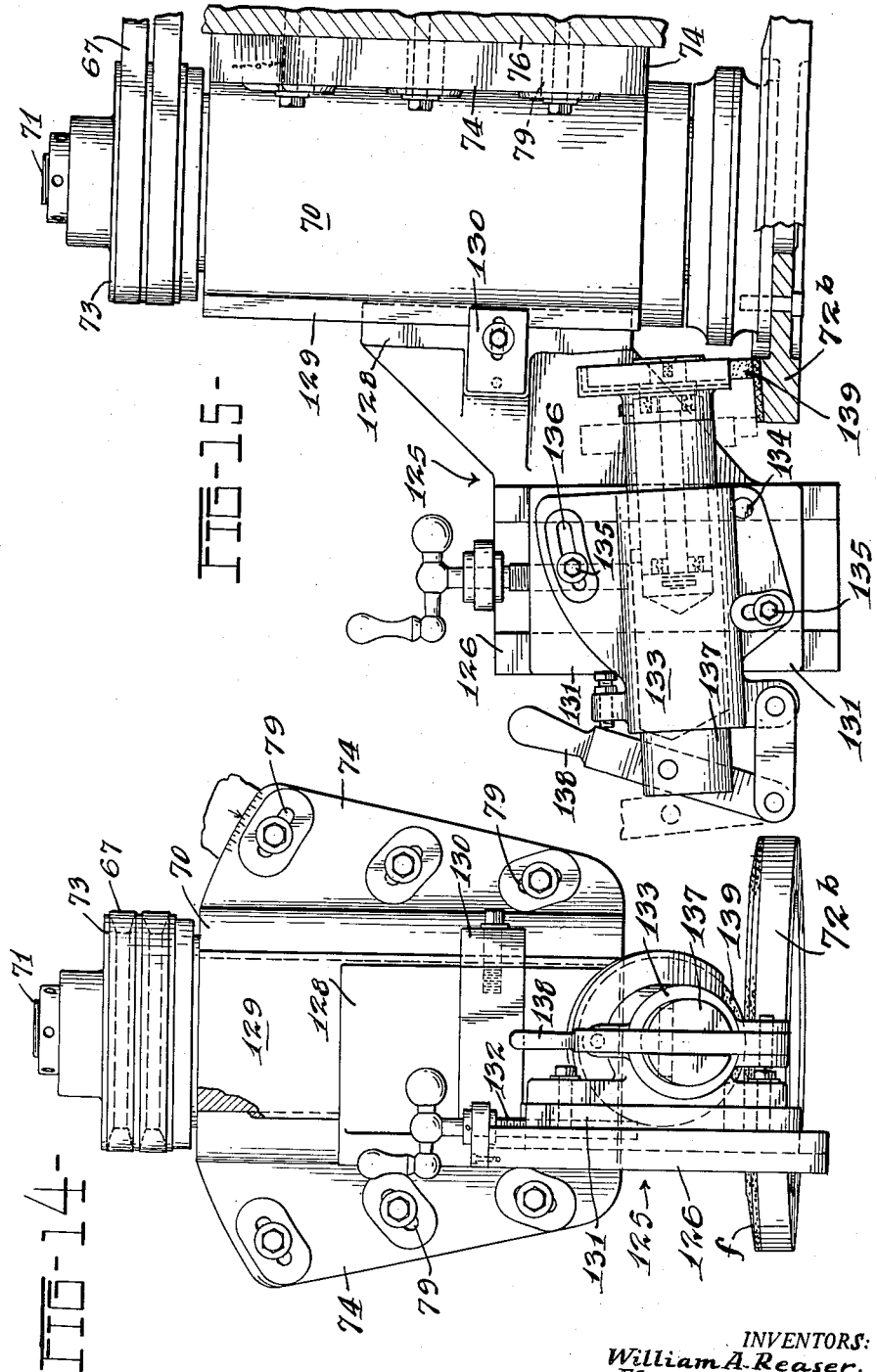

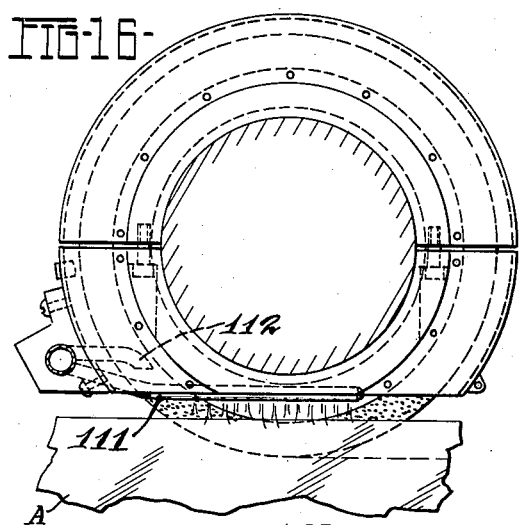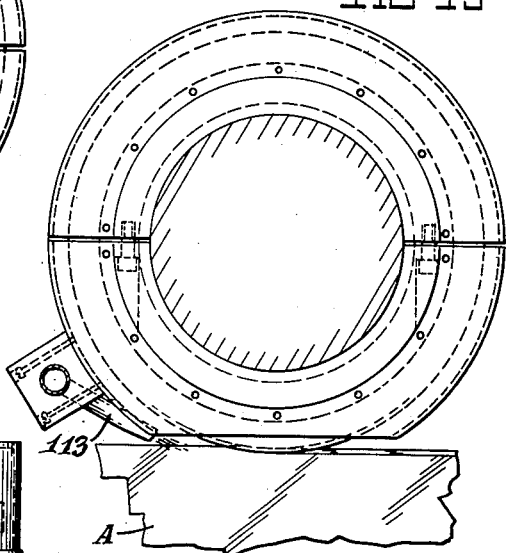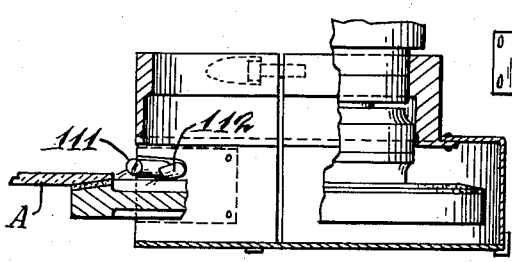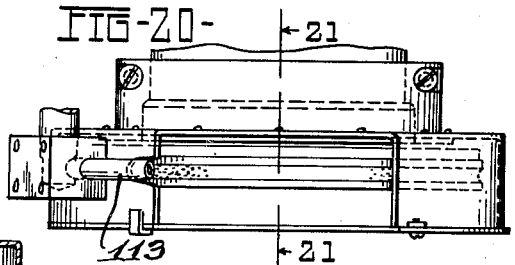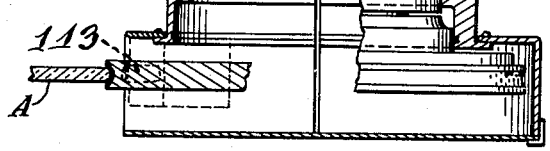

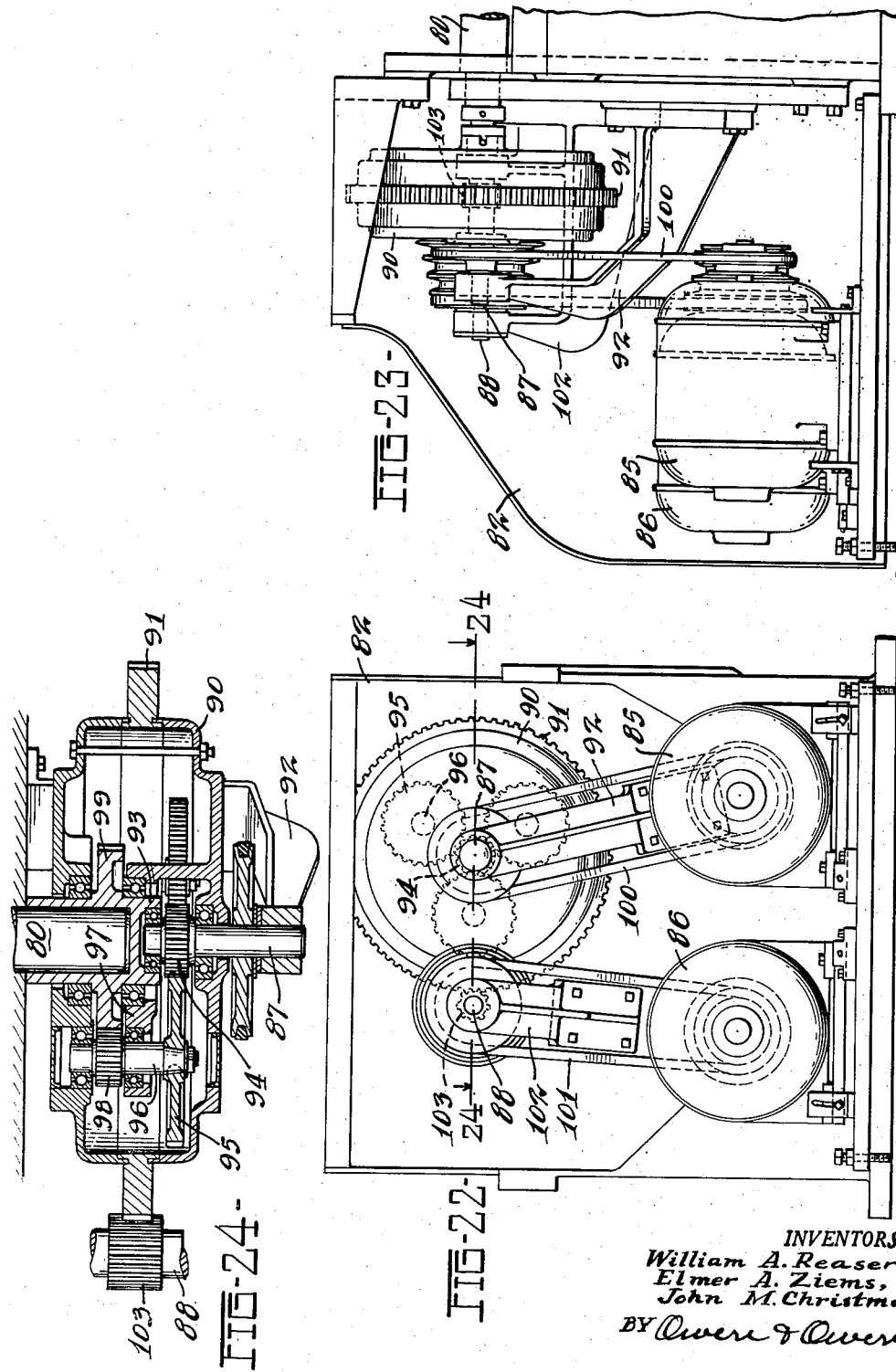

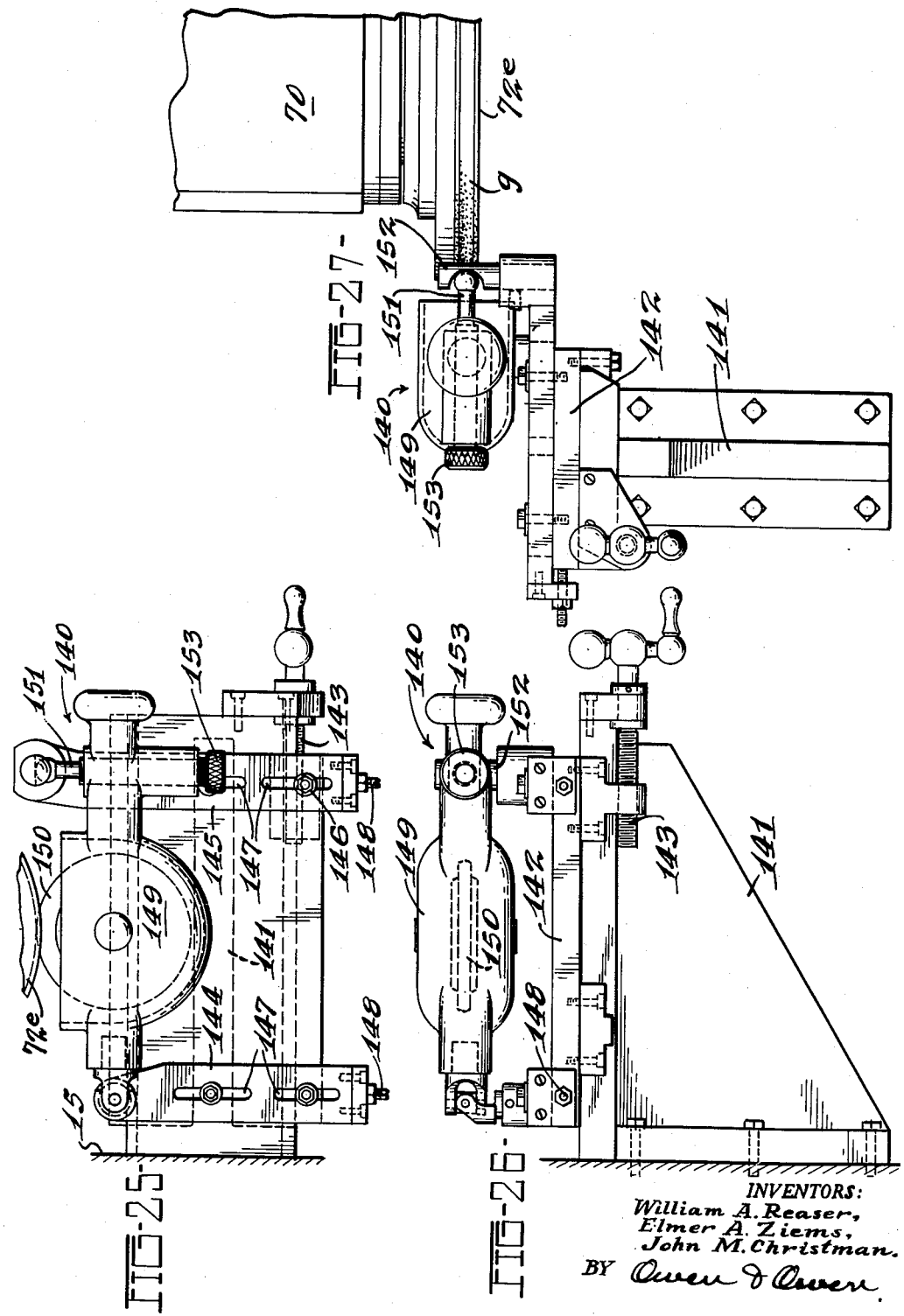

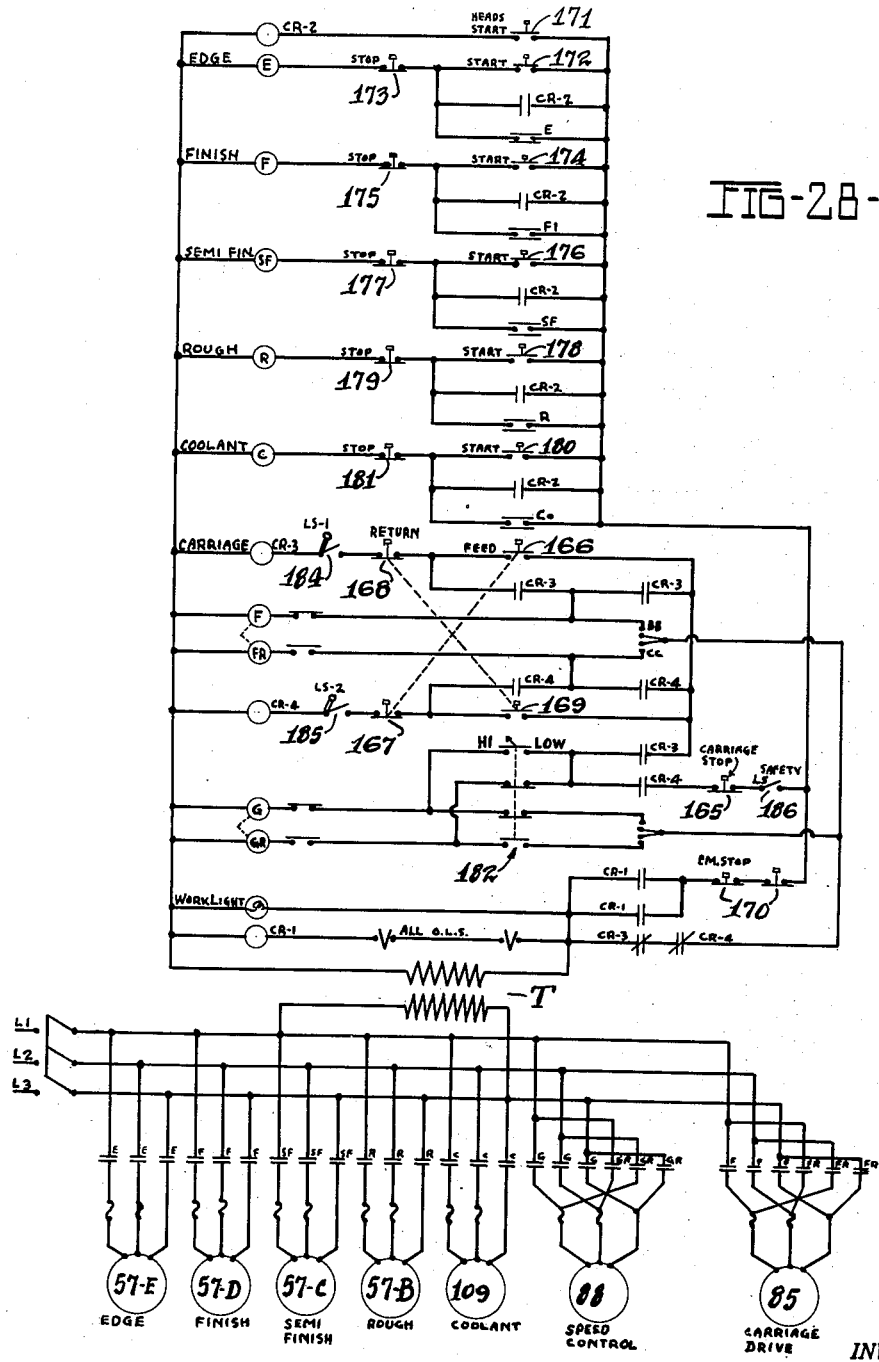

Patented June 10, 1952

2,600,127

UNITED STATES PATENT OFFICE 2,600,127

STRAIGHTEDGE GLASS PLATE BEVELING AND EDGING MACHINE

William A. Reaser, Toledo, and Elmer A. Ziems, Rossford, Ohio, and John M. Christman, Grosse Pointe, Mich., assignors to The Sun Tool & Machine Company, Toledo, Ohio, a corporation of Ohio Application April 13, 1949, Serial No. 87,243

6 Claims. (Cl. 51—3)

This invention relates to machines and methods for grinding bevels on the edges of glass plates and edging the same, and particularly to machines of this class for grinding plates having straight edges.

Due to the glass plate being beveled varying in thickness as much as one thirty-second of an inch and also due to a plurality of glass plates, when placed together on a work table for successive beveling, being of different thicknesses, it is extremely difficult, in the use of machines of this character, to grind uniform bevels having straight as distinguished from wavy edge lines. If the glass being ground is uneven in thickness, which is usually the case, or if a plurality of clamped pieces of glass to be successively ground are uneven in thickness, the line formed by the face of the bevel and by the face of the glass will not be straight and parallel with the edge of the glass if grinding is done on top of glass. As these variations in thickness are increased many times on the bevel line, it is apparent that a glass bevel formed by present methods and machines, so far as we are aware, has a very non-uniform wavy appearance.

The primary object of the present invention is the provision of an apparatus for grinding edges and bevels on glass plates, and particularly straight edge plates, whereby the variation in thickness of the plates will not affect the trueness of the ground bevel and will cause the edges of the bevel to be parallel and straight, and all bevels will be of uniform width.

It is found in practice that this result can be accomplished in a simple and efficient manner by clamping the plate or plates to be beveled to a flat surface in a manner to hold the contacting plate side perfectly flat to such surface, with the edge to be beveled projecting therefrom, and then applying the beveling action to said side. The glass must be held with a sufficiently unyielding force to withstand the great pressure caused by the grinding wheel when cutting, and the clamping means must be heavy enough to absorb any vibration caused by the grinding action. The clamping pressure should be uniformly distributed over the glass whether one piece or a number of pieces are being ground.

Other objects and advantages of the invention will be apparent from the following detailed description and from the accompanying drawings, in which:

Fig. 1 is a perspective front elevation of a machine embodying the invention looking at the power transmission end thereof, with parts broken away and with the carriage, on which the grinding units are mounted, in starting position at the left end of its stroke; Fig. 2 is a rear perspective view of the machine, taken from the opposite end thereof to that of Fig. 1, with parts broken away and with the carriage moved forward from starting position; Fig. 3 is an enlarged perspective view of the work-supporting table and associated work-clamping means, with parts broken away; Fig. 4 is an end view of the machine looking at the same end as in Fig. 2, with parts removed; Fig. 5 is a top plan view of the machine with the carriage in starting position; Fig. 6 is a front elevation thereof, with parts broken away; Fig. 7 is an enlarged vertical cross-section of the machine taken on the line 7—7 in Fig. 5, with a grinding wheel in engagement with the work, with the carriage in section, and with parts removed; Fig. 8 is an enlarged end detail of the work-holding and gauging means, with parts broken away, and with the work gauge in gauging position; Fig. 9 is an enlarged front detail of the work-holding and gauging means, with parts broken away, and with the gauge in work-gauging position; Fig. 10 is a section on the line 10—10 in Fig. 9, with the gauging means in lowered inoperative position, and with parts broken away; Fig. 11 is an enlarged section on the line 11—11 in Fig. 9; Fig. 12 is an enlarged perspective detail of one of the clamping sections of the work-holding means; Fig. 13 is a fragmentary section on the line 13—13 in Fig. 10 illustrating the clamping of work of uneven thickness; Fig. 14 is a front detail of one of the grinding units with the wheel-dressing means attached thereto; Fig. 15 is a side view of the parts shown in Fig. 14, with parts in section; Fig. 16 is an enlarged horizontal section through a grinding head looking down at a bevel-grinding wheel and illustrating the coolant discharging means in association therewith; Fig. 17 is a front side elevation of the grinding head parts and coolant discharging means shown in Fig. 16; Fig. 18 is a section on the line 18—18 in Fig. 17, with parts in full; Fig. 19 is a section similar to Fig. 16 of the edge-grinding head showing the manner of distribution of coolant thereto; Fig. 20 is a fragmentary side elevation thereof; Fig. 21 is a section on the line 21—21 in Fig. 20, with parts in full; Fig. 22 is an elevation of the power transmitting means for the carriage; Fig. 23 is a side view thereof; Fig. 24 is an enlarged section of the differential power transmission taken on the line 24—24 in Fig. 22; Fig. 25 is a plan view of the edging wheel trimming means in wheel trimming position; Figs. 26 and 27 are side and end elevations thereof, and Fig. 28 is a diagram of the electric wiring for the machine.

Referring to the drawings, 1 designates the body frame of the machine and this, as best shown in Figs. 2 and 4, is of hollow skeleton form substantially rectangular in cross-section with an open top and of considerable length. Front and rear rails 2 and 3 are mounted, respectively, on the front and rear top edge portions of the frame and support a carriage 4 for forward and backward movements lengthwise of the frame. The frame rail 2 comprises a ground cylindrical bar that is straddled by a series of saddles 5 on the under side of the carriage at its front edge portion and which serve to support the carriage and guide its movement. The rear rail 3 is engaged by anti-friction rollers 6 on the rear edge portion of the carriage. This form of guide and support for the carriage requires less accuracy when machining the base frame and eliminates danger of galling.

A plurality of brackets 8 (Fig. 4) project forward in longitudinally spaced relation from the front side of the frame 1 intermediate its ends, and these brackets support and are connected by a heavy plate or beam-like structure 9, which in turn supports the rear or inner edge of a work-supporting table 10 in forwardly spaced relation to the carriage 4. The table 10, which is perfectly flat on top for supporting the glass plates A to be beveled, is mounted at its front or outer edge by legs 11 resting on adjustable screw feet or other suitable adjustable supports. The work plates A are placed on the table 10 with a straight edge thereof to be beveled projected beyond the inner edge of the table slightly more than the width of the bevel, and these plates are firmly clamped to the table by a clamping head 12, as best shown in Fig. 10. This head and its manner of operation are best shown in Figs. 8 to 13.

The head 12 includes a top beam-like member 13 extending crosswise over the inner edge of the table and guided at its ends in vertical grooves 14 provided in standards 15 rising from the beam structure 9 on the body frame 1 at each end of the table. The member 13 is provided at its lower edge with a pressure foot 16 projecting at its side edges beyond the sides of the member 13 and loosely carrying a plurality of pressure shoes 17. These shoes are of rectangular form in horizontal section and are placed in side abutting relation lengthwise of the clamp to provide a substantially continuous pressure member for engaging the surface of the glass plates A in opposition to the table. Each shoe 17 is provided in its top with a cross-recess 18 which receives and is of greater depth than the pressure foot 16. The top side edge walls of the recess engage over the edges of the foot 16 to limit the outward movement of one relative to the other. A yielding cushion means 19 is disposed within the recesses 18 of the several pressure shoes 17 and receives the thrust of the pressure foot 16 to equalize its pressure on the several shoes and at the same time permit relative movements thereof to compensate for any variation in thickness of a glass plate or plates being clamped. The cushion 19 comprises a hose-like member closed at its ends and partially filled with a non-compressible fluid so that it will automatically adjust itself to different positions of the pressure shoes without variation in the pressure applied thereto. The shoes 17 have their glass coacting bottom surfaces faced with canvas or other suitable material 17a to prevent marring of the glass.

Mounted on the upper end of each standard 15 is a vertical cylinder 20 containing a piston 21 that is connected by a rod 22 to the respective end of the clamping head beam 13 so that movements of the pistons in the cylinders will raise and lower the clamping head 12. Air under pressure is admitted to the cylinders at one side or the other of the pistons from a supply pipe 24, a control valve means 25 and distributing pipes 26 (Fig. 3). The control means is of any well-known type suitable for directing the flow of air under pressure to both cylinders at either side of the pistons and for relieving the pressure in the side opposed to that to which the air is being admitted. This means need not, therefore, be described in detail. The air supply is also through a common form of filter and pressure gauge unit 27. A shaft 30 is disposed at one side of the clamping head 12, being mounted at its ends in the standards 15, and has pinions 31 in engagement with vertical racks 32 on the respective end portions of the body member 13 of said head to cause the two ends of the head to have uniform raising and lowering movements.

At the inner side of the table 10, below its top edge, is mounted a normally operable gauge and stop means for properly positioning the front edge of the glass plates A for beveling. This means, which is best shown in Figs. 8, 9, 10 and 11, includes a rockshaft 35 parallel to the front table edge and mounted in bearing brackets 36 projecting from the table below the path of movement of the beveling means hereinafter to be described. On one end of said shaft is mounted an operating arm 37 having a manually releasable spring catch 38 at its outer end for engagement with notches 39 in a segment 40, fixed to the table, to hold the arm in different adjusted positions. A plurality of gauge arms 41 are mounted on the shaft 35 intermediate the bearing brackets 36 and each has a gauge pad 42 at its outer end. A lowering of the arm 37 causes the pads 42 to swing up into gauging position for the front edges of the work plates when placed on the table, as shown in Fig. 8. A stop 43 on the upper edge portion of the segment 40 stands in the path of movement of the arms 37 and limits its such movement.

The carriage 4, which is mounted for reciprocatory movements on the base rails 2 and 3 in parallel relation to the inner table edge, has a plurality of work abrading units mounted thereon, in the present instance four in number and designated B, C, D and E in Fig. 6. Each of these units (Figs. 4 and 7) comprises a base 45 mounted in a respective guideway on the carriage 4 for adjusting movements in a line at right angles to the carriage movement, such adjustment being accomplished by turning a screw shaft 46 in engagement with the respective unit. A hand wheel 47 on the rear end of the shaft is provided with a peripheral graduation 48 with which a pointer 49 on the carriage registers. The base 45 is locked in adjusted position by hand clamping screws 50. On the top of each base 45 near its forward or inner end is mounted a frame block 51 for rocking adjustment on a shaft 52 in a vertical plane at right angles to the carriage movement. Such adjustment is effected by the turning of a screw 53 on the base portion of the block in thrust engagement with the base 45, and the adjustment is maintained by a screw 54 on the block having clamping engagement with a slotted arm 55 on the base.

A respective electric motor 57 (sometimes identified with the particular unit by the inclusion of the designating letter for such unit) is mounted on the rear side of each frame block 51 with its shaft axis upright. The motor case, in the present instance, has a mounting plate 58 fixedly attached to its inner side and pivoted for horizontal rocking adjustment to a carrying member 59 that is mounted for vertical adjustment on the rear side of the block 51. The plate 58 is rockingly adjusted by screws 60, at opposite sides of its axis bearing against the member 59. The vertical adjustment of the member 59 on the block is effected by the turning of an associated hand screw 61 that is journaled in a bracket 62 on the upper end of said member and has its lower end threaded in the top of the block. The member 59 is rigidly held in adjusted position by screws 63 extending through slots 64 in block flanges and threading into the member 59. Each screw 61 is provided with a hand wheel 65. The motor shaft carries one or more pulleys 66 at its upper end for drive belts 67, for the associated element. A cover 68 is disposed over each unit.

On the front or inner side of each frame block 51 is mounted a bearing head 70 for vertical and rocking adjustment, and in this is mounted a vertically disposed shaft 71 carrying an abrading wheel 72 at its lower end and which, for the purpose of identification with its particular unit, is given the designation B, C, D and E, corresponding to the designation of the particular unit. The shaft 71 at its upper end carries pulleys 73 with which the respective drive belts 67 connect. In the present instance, the head 70 for each unit is provided at its inner side relative to the frame block 51 with oppositely projecting wings 74 that are attached by screws 75 to a vertically adjusting member 76 that is attached to the respective block 51, and the head is vertically adjustable in the same manner as the member 59 that carries the motor. The hand adjusting screw for the member 76 is designated 77. The bearing head 70 has pivotal connection with the member 76, as indicated at 78 (Fig. 7), to permit transverse rocking adjustment of the head relative to the member. In addition to the screws 75, the head 70 is held in adjusted clamped relation to the frame block 51 by bolts 75a that project through the flanges 74, member 76 and the flange portions of the block. For the purpose of said pivotal adjustment of the head 70, the bolts or screws 75 and 75a pass through respective slots 79 in the flanges 74, such slots being concentric to the axis of the pivot 78.

The several abrading units B, C, D and E, are mounted in successive order from right to left (Figs. 1, 5 and 6) lengthwise of the carriage 4 and at the left side of the table 10 when the carriage is in its normal at-rest or starting position. First in the order of engagement with the work is the rough beveling wheel 72-B; then the semi-finishing wheel 72-C; then the finishing wheel 72-D, and last the edging wheel 72-E, so that as the carriage moves from left to right, or traverses its bevel-forming stroke, the abrading wheels successively act to perform their respective operations on the under side of the exposed edge portions of the glass plates A that overhang the inner table edge. The wheels 72-B, 72-C and 72-D have their top marginal edge surfaces beveled as indicated at b, so as to impart the desired bevel to the edges of the glass plates as they pass thereunder, as shown in Fig. 7. It is preferable to laterally tilt the head 70 relative to the carrying blocks 51, so that the line of engagement of the wheel with the glass is at one side of a line that is at right angles to the edge line of the glass and diametrical to the wheel axis, as illustrated in Fig. 7. This causes the abrading lines of the glass to be crosswise instead of lengthwise of the bevel, thus enabling them to be more readily and effectively wiped out by the finishing wheels. An adjustment of each abrading unit about its shaft 52 facilitates adjustment of the wheel to suit the inclination and width of the bevel cut desired, and this is aided by a vertical and transverse swinging adjustment of the bearing head 70 relative to the block 51.

The feed means for the carriage 4 comprises a long lead screw 80 passing through a feed nut 81 on the under side of the carriage and being journaled at its power end in the adjacent wall of a housing 82 located at the right end of the base frame 1 looking at the rear as in Fig. 2. The screw extends nearly the full length of the base frame intermediate the carriage rails 2 and 3 and has its outer or left end (Fig. 2) journaled in two longitudinally spaced bearings 83 and 84. By using two bearings at the end of the lead screw the sag of the screw, due to its length and weight, can be considerably reduced over what it would be if only one bearing were used at its outer end. If the bearings are in line, it is found that the sag is reduced by about one-half, whereas if only one bearing is slightly lowered relative to the other, the sag will be reduced to about one-quarter of what it would be if only one bearing were used.

The power and transmission means for the lead screw is located in the housing 82 and comprises, in the present instance, two electric motors 85, 86, driving respective shafts 87 and 88 of a planetary transmission gearing (Figs. 22, 23, 24). This transmission includes a case 90 rotatable about the aligned axes of the drive shaft 87 and lead screw 80 and having a circumferential ring gear 91 fixed thereto. The shaft 87 is journaled at its outer end in a bracket arm 92 and projects centrally into the case through a bearing in its side and has an end bearing in the inner end of a sleeve 93 that is fixedly mounted on the power end of the lead screw 80. A sun gear 94 is fixed to the shaft 87 within the case and meshes with a series of planetary gears 95 mounted therearound. These gears are carried by respective shafts 96 journaled in a ring or spider 97 that in turn is journaled on the inner end portion of the sleeve 93. Each shaft 96 is journaled at one end in the respective side of the case 90 and carries a pinion 98 in mesh with a gear 99 fixed to the sleeve 93. Power from the motor 85 to the shaft 87 is through a belt and pulley connection 100.

It is thus apparent that when the case 90 is stationary, power is transmitted through the shaft 87, gears 94 and 95, shafts 96 and gears 98 and 99 to the lead screw. For slower speed of the lead screw, power is transmitted from the motor 86 to the shaft 88 through a belt and pinion connection 101. The shaft 88 has bearings in a bracket 102 and carries a gear 103 in mesh with the ring gear 91. A driving of the gear 103 causes the case 90 to turn at a predetermined speed and to carry the planetary shafts 96 with their gears around the axes of the shafts 80 and 87 and thus reduce the speed of driving of the lead screw 80 from the shaft 87. In practice, the shaft 89 is driven in only one direction by its motor 86, while the motor 85 is of the reversible type and drives the shaft 87 in one direction or the other, depending on the desired direction of movement of the carriage 4. In Fig. 1, 104, 104, represent standard type plug-in switches in connection with the motors 85, 86, so as to permit a speed control range for the carriage movements.

The coolant for the grinding wheels is pumped from a sump chamber 108 by an electric pump 109 and directed to the several grinding wheels through a suitable distributing system indicated 110 in Fig. 2. This system has two nozzles 111 and 112 (Figs. 16, 17, 18) associated with each of the bevel grinding and finishing wheels 72–B, 72–C and 72–D (Fig. 5), the nozzle 111 extending over the bevel surface adjacent to the point of engagement with the work and being perforated to direct a plurality of small streams down against the wheel. The other nozzle directs a single stream over the bevel surface of the wheel in advance of its engagement with the work. A nozzle 113 (Figs. 19, 20 and 21) is associated with the work edging wheel 72–E and directs a stream of coolant against the edging groove tangentially thereof and toward the work-engaging point, as shown in Figs. 19 and 20. The coolant, together with the removed grit from the wheels, drains into a settling tank 115 (Figs. 4, 5 and 6) and is discharged therefrom into a tank 116 in one end of the base frame 1 and from it into a rear settling tank 117. This tank has a plurality of successive settling compartments 118 along one side and the coolant flows from one to the other of these over the dividing partitions 119. At the far end the flow is over a low wall partition at 120 into the long compartment 108 from which the coolant pump 109 takes its supply for the cooling system. The tank 115 is broad at both ends of the table 10 and narrow between the inner edge of the table and the top edge portion of the base frame 1, and is supported by the frame brackets 8 and front frame plate 9.

In Figs. 14 and 15 is shown a dressing means 125 for the bevel grinding wheels. This means includes a vertically disposed bracket plate 126 provided at its inner edge with a foot plate 128 that seats against a flat dovetail male part 129 on the front side of the respective head 70 and has at one edge an undercut flange that engages under one edge of said part. The other edge of the plate 128 is provided with a screw-operated clamp 130 engaging under the other edge of said dovetail part and serving to hold the bracket in adjusted relation to the head 70. A plate 131 is mounted for vertical adjustment on a side of the plate 126 in a way provided thereon and is engaged by an adjusting screw 132 carried by the part 126, whereby a turning of the screw will vertically adjust the plate 131. A bearing sleeve 133 has a flat bearing at one side against the plate 131 and is pivoted thereto at 134 (Fig. 15) for vertical swinging adjustment and is clamped in adjusted position by screws 135 extending through arcuate slots 136 in flanges on the sleeve 133 for movements toward and away from the axis of the associated grinding wheel. A bar 137 is mounted for reciprocatory movement in the sleeve 133. A lever 138 connects bar and sleeve and is operable to impart axial movements to the bar. A trimming wheel 139 is carried at the inner end of the bar 137 for free rotary movements in a plane normal to the bar axis and is adapted to have peripheral trimming engagement with the bevel grinding surface of the associated grinding wheel. The trimming wheel may be moved inward and outward on the grinding surface of the abrading wheel by axial movements of the carrying bar and can be properly adjusted to said grinding surface by vertical adjustment of the plate 131 and pivotal adjustment of the bearing sleeve 133. This trimming means can be used in connection with any bearing head 70 and removed entirely therefrom when the trimming has been effected.

A trimming means 140 (Figs. 5, 6, 25, 26 and 27) for the edging wheel 72–E is mounted on a bracket 141 secured to the outer side of the standard 15 at the right end of the table 10. This means includes a base plate 142 adjustable lengthwise of the bracket in the plane of movement of the carriage 4 by a hand screw 143 and has spaced bars 144 and 145 mounted crosswise thereon, and is adjustably clamped thereto by bolts 146 passing through slots 147 in the bars. Fine lengthwise adjustment of each bar is accomplished by screws 148. An arbor 149, carrying a trimming wheel 150 for the peripheral edging groove g, is attached at one end to the bar 144 for universal swinging movements and its other end is provided with a gauge pin 151 which projects from the arbor in the plane of rotation of the trimming wheel and bears against a curved surface of a template 152 rising from the plate 142. The pin 151 is threaded in the arbor end for axial adjustment and has a head or handgrip 153 at its outer end. A hand knob 154 is provided on the free end of the arbor to facilitate hand control of its movements.

The control system for the various electric motors of the apparatus is illustrated diagrammatically in Fig. 28 and includes a set of controls 160 (Fig. 1) for the carriage movements conveniently located above the left side of the work table, and a second set of controls 161 (Fig. 1) for the several grinding wheel motors 57, the coolant pump motor 109 and the speed control plugging switches 104, 104, of the two motors 85 and 86.

Referring to the control set 160, the button $h$ controls the carriage feed stop switch 165 (Fig. 28); the button $i$ controls the carriage feed switches 166, 167; the button $j$ controls the carriage return switches 168, 169, and the button $k$ controls the emergency stop switch 170.

Referring to the control set 161, the button $l$ controls the main switch 171; the buttons $m$ and $m'$ control the starting and stopping switches 172, 173, respectively, for the edge grinding motor 57–E; the buttons $n$ and $n'$ control the starting and stopping switches 176 and 177 for the semi-finish grinding wheel motor 57–C; the buttons $p$ and $p'$ control the starting and stopping switches 178 and 179 for the rough grinding wheel motor 67–B; the buttons $q$ and $q'$ control the starting and stopping switches 180 and 181 for the coolant pump motor 109, and buttons $r$ and $r'$ control the high-low switches 182 for the speed control motor 86.

The carriage 4 at the end of its forward stroke is automatically stopped by striking and opening a stop switch 184, and it is likewise stopped at the end of its return stroke by striking and opening a feed circuit switch 185 (Fig. 2). A safety switch 186 is also connected with the carriage feed circuit in association with the work-gauge arm 37, so that when the arm is in full lowered position, as shown in Fig. 8, the switch will be engaged and held open by said arm. This prevents any feeding movement of the carriage from being started when the glass stop gauge is in glass-gauging position.

As shown in the wiring diagram (Fig. 28) power for the control circuit and control relays is derived from a transformer T connected across the outside lines L-1 and L-3. The actuating coils for the relays are indicated in the control circuits associated with the secondary of the transformer T and the relay contacts themselves are indicated as interposed between the several motor windings and the power lines L-1, L-2 and L-3. The relay coils are designated with the same reference characters as used to designate the associated contacts. Other relay coils and their contacts in the control circuits have the same character designations.

In Figs. 2, 5 and 6, the machine is shown as equipped with a splash curtain 200 extending forward a distance from the forward front edge of the carriage 4 and extending vertically from a point some distance above the level of the work table 10 to a point below the front top edge of the base frame 1. This curtain is suspended from a table 201 that extends from the forward front edge of the carriage 4 to beyond the forward end of the frame 1; thence across the machine to the rear side of the frame around guide sheaves 202; thence to the opposite end of the frame and crosswise thereof around guide sheaves 203 supported by the housing 22, and thence to the rearward front edge of the carriage to which it is attached. The table is taut so that any movement of the carriage will move the cable and curtain therewith.

In the operation of the machine, one or more glass plates A are placed on the table 10 in successive order lengthwise of its inner edge with the plates projecting over said edge a distance permitted by the gauge pads 42, which, for such purpose, stand in the raised position shown in Fig. 8. When the gauge means is in this position, the safety switch 186 in the operating circuit is held open by the arm 37 so that the control circuit is dead, and no operation of the carriage is permitted until the gauge means has been moved to inoperative position. The glass plates having been properly positioned on the table, the operator moves the control of the valve unit 25 to admit air under pressure to the upper ends of both cylinders 20 at the ends of the table, thus forcing the plungers 21, rods 22 and work-clamping means 12 down and causing the separate blocks 17 to be pressed into holding engagement with the glass plates to clamp them to the table surface. The yielding response of the blocks 17 to the applied pressure, due to the cushion means 19 between the parts 16 and 17, permits said blocks to adjust themselves to any unevenness in thickness of the glass plates and, therefore, to hold the under surface of the plates, with uniformly distributed pressure, flat to the table. The work having been clamped to the table in edge beveling position and the gauge means returned to its inoperative position, the motors 57 for the several grinding units and the pump motor 109 for the coolant system having been started, the control button $i$ for the carriage feed is then pressed, causing the carriage to move forward on the frame 1. During such forward stroke of the carriage, the rough grinding wheel 72-B first engages and travels along the under surface of the projecting edge portion of the glass plates to be followed by the semi-finishing wheel 72-C, the finishing wheel 72-D, and the edging wheel 72-E, so that when the carriage 4 has completely traversed its forward stroke of movement, the under side of the projecting edge portion of the glass plate or plates will have been beveled to a smooth surface and the extreme edge of the plates rounded. This action gives a very fine finish to the bevel surface, requiring a minimum of subsequent final cleaning and dressing action. During this grinding action, the pressure applied thereby is against the holding means 12, which is sufficiently strong and rigid in its nature to absorb any vibration resulting from the grinding action. While, in the present instance, the glass plates are clamped to a subjacent flat surface and the grinding pressure is upward against such surface, it will be understood that the plates could be clamped to a superposed flat surface, in which event the grinding pressure would be on the upper side of the plate. In other words, the idea of the invention is to hold the plate to a flat surface by an opposed clamping means and to apply the beveling action to the side of the plates engaging the flat surface.

When the carriage reaches the end of its forward stroke, it engages the stop switch 184 which opens the carriage operating circuit. The carriage is then returned to its normal starting position by pressing the control button $j$ which opens the return carriage operating circuit. When the carriage has returned to its initial starting position, it strikes and opens the stop switch 185. The driving of the carriage is through the lead screw 80, the speed of which, both for forward and rearward movements, is controlled by the buttons $r$ and $r'$ in connection with the high-low switches 182. In this manner the carriage may be caused to have either a rapid or slow movement in either direction, as may be desired. Both motors 85 and 86 are used for rapid traverse, while one drives and one controls for slow feeding movement. The relationship of the grinding wheels to the work to suit the angle of bevel and the height of the work relative to the grinding wheels may be nicely and accurately obtained by the adjustments permitted by the mounting of the unit blocks 51 on the bases 45 and the mounting of the grinding wheel head 70 on the respective blocks. Such adjustment is also facilitated by the inward and outward movements of the grinding units on the carriage.

We wish it understood that our invention is not limited to any specific construction, arrangement or form of the parts, as it is capable of numerous modifications and changes without departing from the spirit of the claims.

Having thus described our invention, what we claim as new, and desire to secure by United States Letters Patent, is:

1. In a machine of the class described, wherein a glass plate is held with an exposed edge, a carriage, means guiding said carriage for reciprocatory movements along said exposed edge in spaced relation thereto, a base member mounted on said carriage for adjustment transverse to its line of movement, a block carried by said base for tilting movement about a horizontal axis substantially parallel to said plate edge, a bearing head carried at the side of said block adjacent to said edge, means mounting said head on a side of the block adjacent to said edge for various adjustments relative to the block, a shaft journaled in substantially vertical position in said head, a bevel grinding member carried by said shaft for beveling engagement with the exposed plate edge as it passes therealong with the carriage, and means carried by said block and operable to drive said shaft.

2. An arrangement as called for in claim 1, wherein said shaft and operating means are in counterbalancing positions at opposite sides of said block and the operating means constitutes a motor that is mounted to the block on the opposite side thereof to said bearing head for vertical and swinging adjustment relative thereto, together with means mounting the drive means on the block for said adjustment.

3. In a machine of the class described, a flat surface, means for clamping a glass plate to said surface with an exposed edge to be acted on projecting beyond an edge of said surface, stop means for the plate edge, means for moving said stop means into and out of stop engagement with such edge, an electric control circuit for the machine, and a normally closed switch in said circuit in the path of movement of said second and third means and operable thereby to open the circuit when the stop means is in plate edge engaging position.

4. In a machine of the class described having means for holding a glass plate with a projecting edge portion in position to be ground, and a carriage guided for movements lengthwise of said edge in spaced relation thereto, the combination of a grinding unit mounted on the carriage for movement therewith, said unit comprising a base mounted on the carriage for adjustment transverse to its line of movement, means operable to transversely adjust said base relative to the carriage, a block pivotally mounted on said base for tilting adjustment in a vertical plane parallel to the line of adjustment of the base and having a vertical face, means for locking said base and block in adjusted relation, a bearing head mounted on the vertical face of said block adjacent to said plate-holding means for both vertical and tilting adjustment relative to said block with the axis of tilting adjustment transverse to the tilting axis of the block, a shaft journaled in generally vertical position in said bearing head, a grinding wheel carried by said shaft in position to engage a projecting plate edge when the carriage is moved lengthwise thereof, and means carried by the block for driving said shaft.

5. In a machine of the class described having means for holding a glass plate with a projecting edge portion in position to be ground, and a carriage guided for movements lengthwise of said edge in spaced relation thereto, the combination of the grinding unit mounted on the carriage for movement therewith, said unit comprising a base mounted on the carriage for adjustment transverse to its line of movement, means operable to transversely adjust said base relative to the carriage, a block pivotally mounted on said base for tilting adjustment in a vertical plane parallel to the line of adjustment of the base and having opposed vertical sides, means for locking said base and block in adjusted relation, a bearing head and an electric motor carried by said block on opposite vertical sides thereof with the grinding head adjacent to the plate-holding means for movement with the carriage lengthwise of the projecting edge of a plate held by said last means, means connecting the bearing head to the block for both vertical and tilting adjustment with the axis of tilting adjustment transverse to the tilting axis of said block, a shaft journaled in upright position in said head, a grinding wheel carried by said shaft in position to engage the projecting edge of a held plate, means connecting the motor to the block for adjustments similar to those of the bearing head, and means connecting and driving said shaft from said motor.

6. In a machine of the class described, a flat surface, means for clamping a glass plate to said surface with an edge thereof projecting beyond an edge of the surface in position to be acted on, a rockshaft having its axis parallel to said edge, plate edge engaging means carried by said shaft and movable into positions to serve as a stop gauge for said plate edge, an operating arm projecting from said shaft, means operable to grind a bevel on said projecting plate edge, an electric control circuit for said means, and a normally closed switch in said circuit in the path of movement of said arm actuated by the arm to open the circuit when said plate edge engaging means is in plate engaging position.

WILLIAM A. REASER.
ELMER A. ZIEMS.
JOHN M. CHRISTMAN.

REFERENCES CITED

The following references are of record in the file of this patent:

UNITED STATES PATENTS

| Number | Name | Date |
|---|---|---|
| 754,755 | Edison | Mar. 15, 1904 |
| 858,887 | Millen | July 2, 1907 |
| 937,912 | Bailey | Oct. 26, 1909 |
| 1,499,989 | Lehmann | July 1, 1924 |
| 1,664,713 | Strickland | Apr. 3, 1928 |
| 1,673,163 | Schmelzkopf | June 12, 1928 |
| 1,862,379 | Koestlin | June 7, 1932 |
| 1,896,533 | Vuilleunier | Feb. 7, 1933 |
| 1,906,739 | Carruthers | May 2, 1933 |
| 1,982,287 | Einstein et al. | Nov. 27, 1934 |
| 2,031,743 | Smith | Feb. 25, 1936 |
| 2,040,466 | Christy | May 12, 1936 |
| 2,264,053 | Russell | Nov. 25, 1941 |
| 2,334,581 | Pyne | Nov. 16, 1943 |
| 2,347,283 | Ross | Apr. 25, 1944 |
| 2,435,059 | Thompson | Jan. 27, 1948 |
| 2,442,042 | Hamilton | Mar. 25, 1948 |
| 2,482,785 | Lohutko | Sept. 27, 1949 |

FOREIGN PATENTS

| Number | Country | Date |
|---|---|---|
| 731,354 | France | May 30, 1932 |